(12) United States Patent
Piesinger (10) Patent No.: US 8,742,977 B1
(45) Date of Patent: Jun. 3, 2014

(54) WIND TURBINE BIRD STRIKE PREVENTION SYSTEM METHOD AND APPARATUS

(76) Inventor: Gregory Hubert Piesinger, Cave Creek, AZ (US)

( * ) Notice: Subject to any disclaimer, the term of this patent is extended or adjusted under 35 U.S.C. 154(b) by 203 days.

(21) Appl. No.: 13/385,705

(22) Filed: Mar. 2, 2012

(51) Int. Cl.
*G01S 13/00* (2006.01)

(52) U.S. Cl.
USPC .............................. 342/61; 342/59; 342/159

(58) Field of Classification Search
USPC .................... 342/27, 59, 61, 90, 464
See application file for complete search history.

(56) References Cited

U.S. PATENT DOCUMENTS

| | | | | |
|---|---|---|---|---|
| 3,153,787 A | * | 10/1964 | Williams | 342/350 |
| 4,952,939 A | * | 8/1990 | Seed | 342/27 |
| 5,448,243 A | * | 9/1995 | Bethke et al. | 342/59 |
| 5,774,088 A | * | 6/1998 | Kreithen | 342/22 |
| 7,375,675 B2 | * | 5/2008 | Barnum | 342/90 |
| 7,864,103 B2 | * | 1/2011 | Weber et al. | 342/123 |
| 2008/0136704 A1 | * | 6/2008 | Chan et al. | 342/201 |
| 2011/0260907 A1 | * | 10/2011 | Roche | 342/27 |
| 2013/0098309 A1 | * | 4/2013 | Nohara et al. | 119/713 |

* cited by examiner

*Primary Examiner* — John B. Sotomayor
*Assistant Examiner* — Marcus Windrich (57) ABSTRACT

A bistatic radar receiver is located on a wind turbine and surrounded by multiple bistatic transmitters to detect and precisely track the positions of nearby birds. Bird target reflections from multiple transmitters are received by the radar receiver and their position and track determined from the transmitter locations, receiver location, and measured transmitter-to-target-to-receiver ranges. Target position and altitude accuracy is similar to GPS. When birds are detected to be on a collision course with the wind turbine, a deterrent is activated to scare them away. Deterrents can be flashing strobe lights, intense sound, air cannon, or any other effective bird deterrent.

15 Claims, 7 Drawing Sheets

WIND TURBINE BIRD STRIKE PREVENTION SYSTEM METHOD AND APPARATUS

TECHNICAL FIELD OF THE INVENTION

The present invention relates to the detection and prevention of imminent bird strikes to wind turbines or other avian hazards such as oil sands tailing ponds and power lines.

BACKGROUND OF THE INVENTION

According to the American Bird Conservancy, national estimates show between 88,000 and 320,000 birds are killed by wind turbines every year. Among these birds killed are many Federally protected birds such as bald and golden eagles. In an effort to reduce these bird kills, the number, locations, and blade speeds of wind turbines are being restricted which impacts the development of wind energy.

Accordingly, there is a need for a low cost method of reducing avian mortality without having to impede the siting and efficiency of wind turbines.

SUMMARY OF THE INVENTION

In accordance with the present invention, a bird strike prevention system is presented which will greatly reduce the incidence of bird collisions with wind turbines or other hazards.

Briefly, to achieve the desired object of the present invention, avian radar is combined with bird deterrent techniques to detect, track, and deter away all birds on a collision coarse with a protected wind turbine. Whenever a high probability of bird collision is detected, a bright flashing strobe light or high intensity sound is directed towards the advancing birds thus deterring them away from the wind turbine.

As an alternative to deterring birds, the wind turbine blades can be feathered thus stopping their rotation. For large wind farms, multiple wind turbine avian radars can be networked together to provide an early warning of arriving birds thus providing more time to feather the blades.

The avian radar consists of a bistatic radar receiver antenna mounted on the wind turbine and multiple bistatic transmitters sited around the wind turbine. An avian target is illuminated by multiple bistatic transmit signals and the reflected signals are received by the bistatic radar receiver antenna. The location of the avian target is determined from the known locations of the transmitters, receiver antenna, and measured transmitter signal ranges. Target position accuracy is primarily set by radar range resolution and is not reduced by antenna beamwidth or target range. Target position accuracy determination is similar to that obtained with the Global Positioning System (GPS).

The bistatic radar receiver antenna is composed of a dipole or other antenna mounted atop the wind turbine. The bistatic radar receiver is mounted at any convenient location such as near the antenna or at the base of the wind turbine tower. Antenna signals are received, digitized, and processed in the receiver to obtain avian target positional information.

In the preferred implementation, low power CW Pseudo Random Noise (PN) coded bistatic transmitters are used to provide either non-coherent or coherent target processing. Targets are tracked as they approach the wind turbine. Target identification is determined based on target reflectivity, altitude, velocity, spectral width, and track patterns.

Other objects and advantages of the present invention will become obvious as the preferred embodiments are described and discussed below.

DETAILED DESCRIPTION OF THE PREFERRED EMBODIMENTS

The goal of the present invention is to provide a low cost avian radar with very advanced features. The radar's primary feature is precise three-dimensional (3D) target position determination. High resolution avian position information is required to avoid activating the deterrents or feathering the blades for birds that are not actually on a high probability collision course with the wind turbine.

Previously, an avian radar was described in patent application Ser. No. 12/661,595 "Three Dimensional Radar Method and Apparatus", filed 18 Mar. 2010 which is incorporated herein by reference. That invention described an avian radar in the context of an airport environment. A number of concepts from that invention are modified and applied to the present invention's avian radar in a wind turbine environment.

Figure 1:
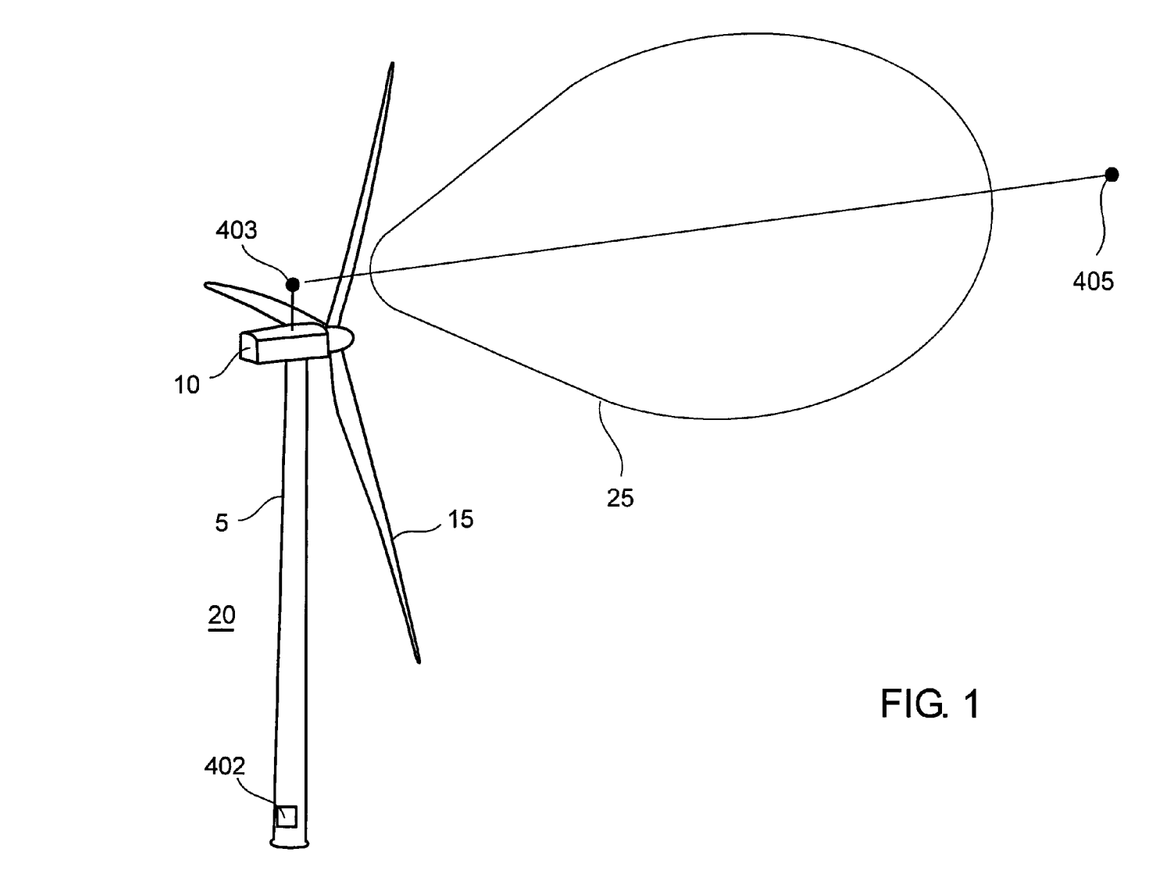
FIG. 1 illustrates wind turbine 20 whose top mounted antenna beam is directed towards avian target 405.

FIG. 1 illustrates wind turbine 20 composed of tower 5, turbine housing 10, and propeller blades 15. Bistatic radar receiver antenna 403 is mounted above turbine housing 10 to obtain an unobstructed view of the radar coverage volume surrounding wind turbine 20. Bistatic radar receiver 402 is mounted in the base of tower 5 for easy maintenance access. Antenna 403 receive pattern 25 is illustrated as pointing towards avian target 405. Bird deterrent strobe lights (not shown) can be mounted on tower 5 or turbine housing 10. Air cannons (not shown) could either be mounted somewhere on wind turbine 20, or more conveniently, on the ground near wind turbine 20.

Figure 2:
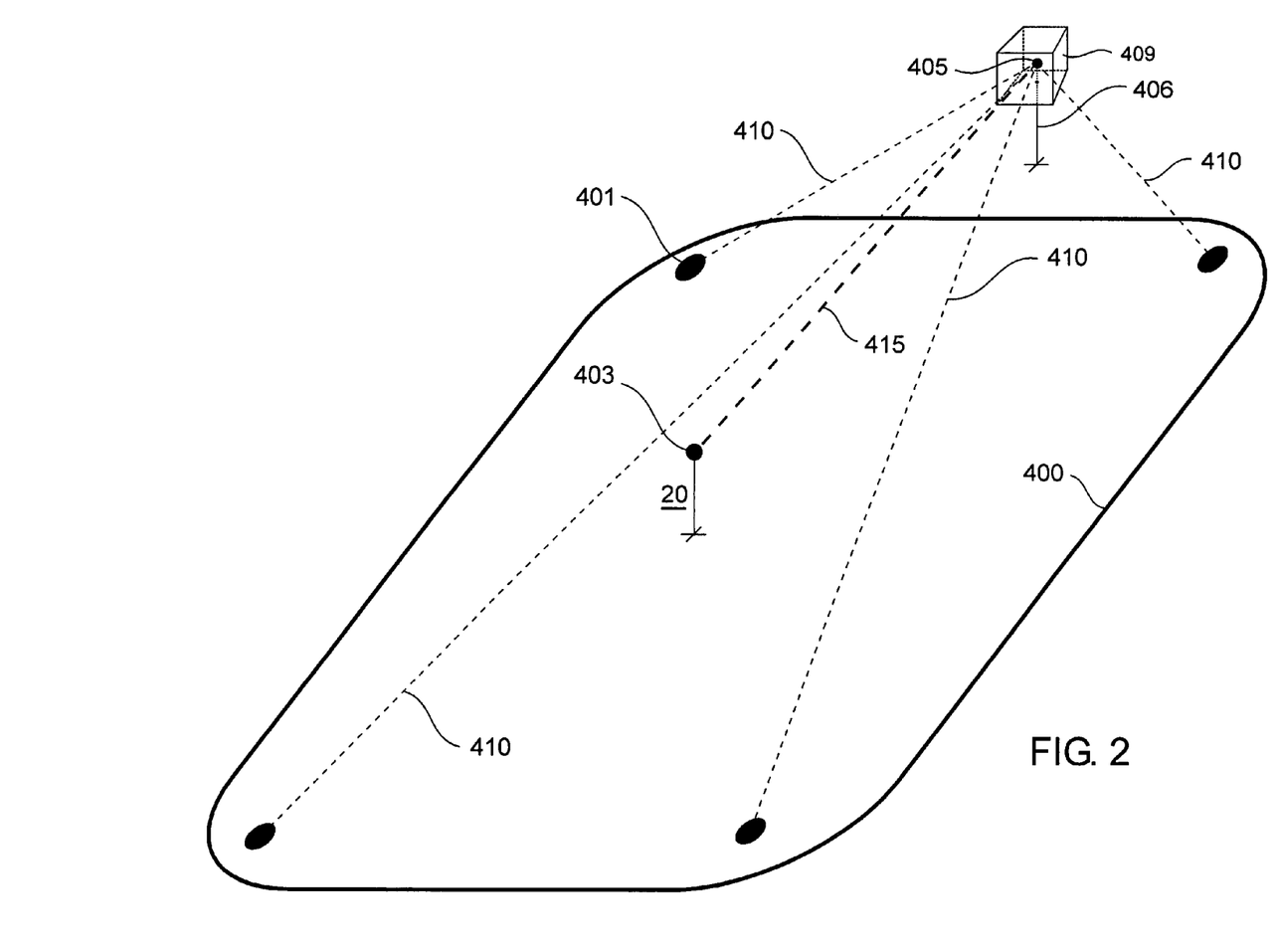
FIG. 2 illustrates 4 bistatic radar transmitters 401 deployed around wind turbine 20 and illuminating avian target 405.

FIG. 2 illustrates 4 bistatic radar transmitters 401 deployed around wind turbine 20. Bistatic radar receiver antenna 403 is mounted atop wind turbine 20. Avian target 405 is somewhere within the design range of the bistatic transmitter array. Bistatic transmitter signals 410 illuminate target 405 at height 406 and their reflected signals 415 are received by bistatic radar receiver antenna 403. The location of target 405 is determined from the known locations of bistatic radar transmitters 401, bistatic radar receiver antenna 403, and measured bistatic transmitter signal ranges. The measured bistatic transmitter signal range is the sum of bistatic radar transmitter signal 410 path length plus reflected signal 415 path length.

The locus of all points, such that the total length from a particular bistatic radar transmitter 401 to target 405 and then to bistatic radar receiver antenna 403 is a constant equal to the signal range for that bistatic radar transmitter 401, defines a 3D line arc. Likewise additional 3D line arcs are defined for all other bistatic radar transmitters 401 signal ranges. The common intersection point of all these line arcs defines the position of target 405.

This process is one of triangulation somewhat similar to position location using GPS. GPS positions are based on solving a set of simultaneous equations by trilateration. Trilateration is a method for determining the intersections of three sphere surfaces given the centers and radii of the three spheres. It also is basically a method of determining position by triangulation as is well known by those skilled in the art of GPS navigation. Triangulation works good for a single target but becomes more complicated when multiple targets are present. Below, a method is described to determine target locations when multiple targets are present.

An alternative solution to triangulation is to construct a lookup table that relates the center of each 3D resolution volume cell 409 with its corresponding measured bistatic transmitter signal ranges. For each 3D resolution volume cell 409 location, a cell list is constructed that contains the signal range value for each bistatic radar transmitter 401. The signal range value is equal to the total path length from that bistatic radar transmitter 401 to 3D resolution volume cell 409 location to bistatic radar receiver antenna 403. Each cell list is associated with 3D resolution volume cell 409 location using a lookup table.

The minimum size of 3D resolution volume cell 409 is based on the radar's range resolution which is defined by the radar waveform range ambiguity function. The actual size of the 3D resolution volume cell 409 is selected by the required position accuracy of the avian radar.

Each 3D resolution volume cell 409 of interest is checked to see if the reflected signal, from a target at that location, for each bistatic radar transmitter 401 matches the lookup table values for that location. If so, then a target 405 is declared at that location. Target 405 size is inferred from the reflected signal 415 amplitudes and other information.

Bistatic radar transmitters 401 transmit signal can all be on the same frequency but modulated with different PN codes similar to GPS signals. For each 3D resolution volume cell 409 examined, a PN code cross correlation with the reflected target signals is performed for each bistatic radar transmitter 401 signal using the lookup table cell list signal range values for those bistatic transmitters. That is, the signal range value defines the cross correlation range delay value to use for each bistatic transmitter. If no cross correlation responses are obtained, or if the cross correlation response falls below a predetermined target detection threshold, that 3D resolution volume cell is declared target free. If a cross correlation response is obtained for all or a sufficient number of bistatic radar transmitters 401, a target and its amplitude are declared for that 3D resolution volume cell 409. If a large number of bistatic radar transmitters 401 are implemented, a sufficient number of cross correlation responses may be somewhat less than the maximum possible since some targets may not be in range of all bistatic radar transmitters 401.

The advantage of checking specific 3D resolution volume cells 409 is that only the cells of interest need to be checked. The cells checked may initially be "skin" cells around a specific volume to be monitored since targets must penetrate the skin to enter the monitored volume. Once a target is detected in the skin, additional cells around the target location are monitored to track the target as it moves through the monitored volume.

Bistatic radar transmitter 401 transmit frequency, power level, bandwidth, and PN code parameters depend on many design factors as is well known by those skilled in the art. Also, more than 4 bistatic radar transmitters can be used if desired.

The timing, frequency, and code sequence zero range time of each bistatic radar transmitter 401 is locked to GPS time as is the corresponding timing and cross correlation codes of bistatic radar receiver 402. This is required so that bistatic radar receiver 402 knows the PN code zero range time of each bistatic radar transmitter 401.

Locking each bistatic radar transmitter 401 to GPS time is a major innovation and advantage of this invention because it allows bistatic radar transmitters 401 to operate autonomously. That is, no communication is required between bistatic radar receiver 402 and bistatic radar transmitters 401. Bistatic radar transmitters 401 can be sited remotely and powered from solar cell charged batteries if desired. This allows bistatic radar transmitters 401 to be sited accordingly to the best bistatic radar transmitter array geometry which eliminates infrastructure power wiring to hard to access locations around wind turbine 20 or within the overall wind farm.

The antenna pattern of each bistatic radar transmitter within the wind farm can be hemispherical to provide omnidirectional coverage. Long range bistatic radar transmitters placed outside the wind farm can have an antenna pattern that directs its signal towards the wind farm. The purpose of these transmitters is to obtain early warning of bird flocks approaching the wind farm.

To reduce ground clutter, bistatic radar transmitters can be designed for low elevation pattern attenuation using techniques developed for GPS receiving antennas. GPS receiving antennas reduce multipath reflections by designing an antenna pattern that has a sharp increase in pattern attenuation at very low elevation angles. One technique used is to place the GPS antenna in the center of a circular ground plane mount containing a series of concentric metal rings around the GPS antenna. The location and vertical height of the metal rings are designed to attenuate the low elevation signals that cause multipath. Attenuating the bistatic radar transmitter low elevation transmit energy reduces ground clutter illumination which in turn reduces bistatic radar receiver 402 low elevation clutter reception.

Figure 3:
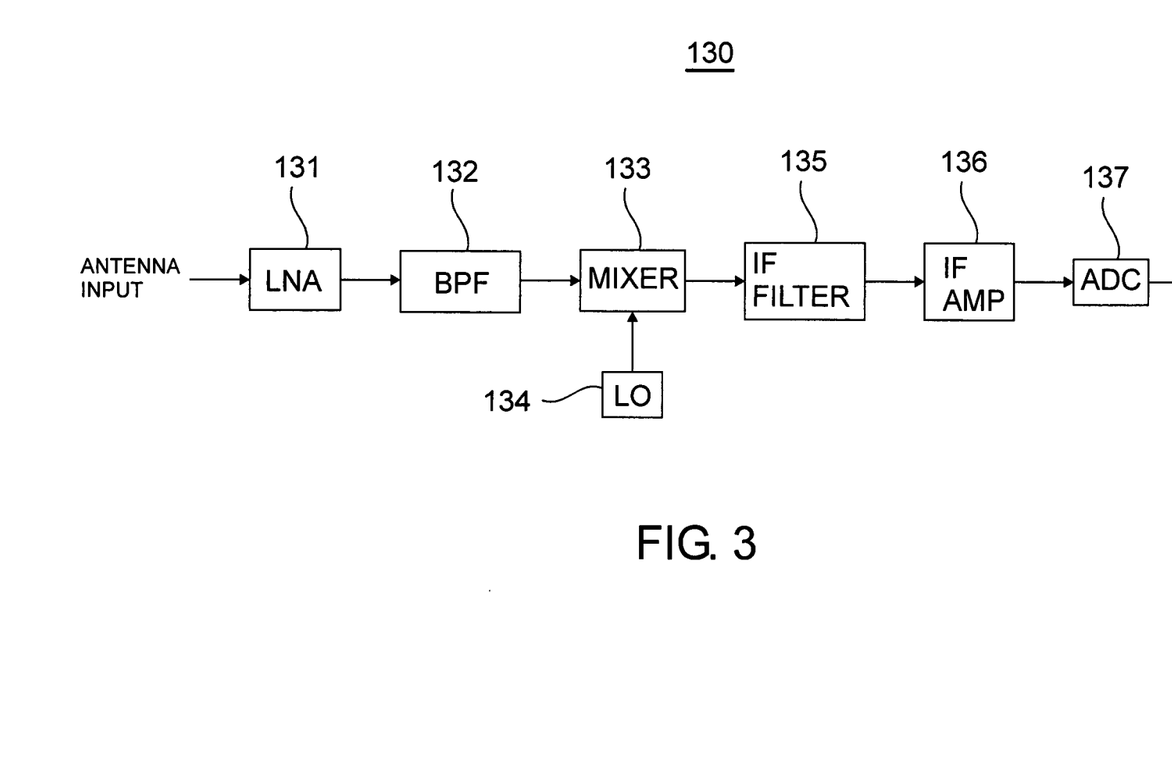
FIG. 3 is a block diagram of the bistatic radar receiver.

Bistatic radar receiver antenna 403 signals are received using receiver 130 illustrated in FIG. 3. Preferred receiver antenna 403 is a simple hemispherical coverage vertical dipole. However, multiple or sectored receiver antennas can also be used. Antenna 403 signals are amplified by low noise amplifier (LNA) 131, filtered using band pass filter (BPF) 132, downconverted to intermediate frequency (IF) using mixer 133 and local oscillator (LO) 134, image and anti-alias filtered using IF filter 135, amplified and buffered using amplifier 136, and digitized using analog to digital converter (ADC) 137.

Figure 4:
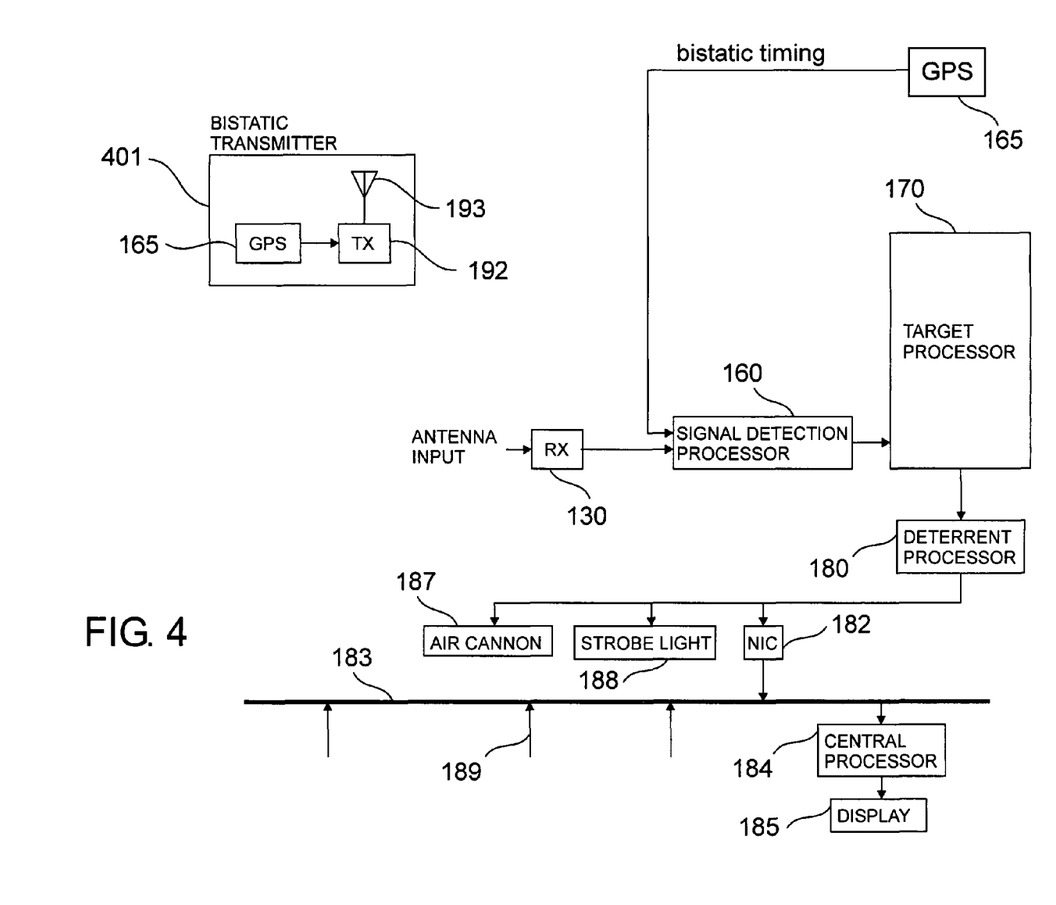
FIG. 4 is an overall block diagram of the subject invention.
Figure 5:
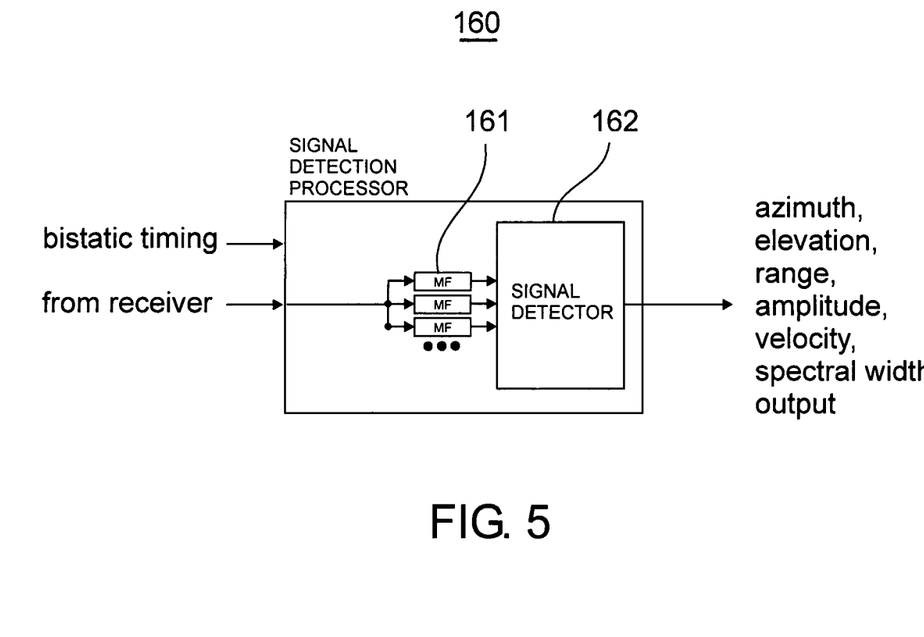
FIG. 5 is a block diagram of the avian radar signal detection processor.

A block diagram of the avian radar system of the subject invention is illustrated in FIG. 4. The output from receiver 130 is applied to signal detection processor 160 illustrated in FIG. 5 which consist of a parallel bank of Doppler matched filters 161 and signal detector 162. GPS receiver 165 provides precise bistatic timing required for signal detector 162 to determine zero range of each bistatic radar transmitter 401.

Each bistatic radar transmitter 401 consists of GPS receiver 165, transmitter 192, and antenna 193.

Received signals from receiver 130 are matched filtered and coherently detected. Detected targets are tagged in terms of their 3D resolution volume cell 409, amplitude, Doppler frequency, and spectral width. Target processor 170 applies tracking and spectral width algorithms to eliminate non-avian targets, identify probable bird type, and form target tracks for deterrent processor 180. Deterrent processor 180 determines if an avian target is on a high probability collision course with wind turbine 20. If so, the correct deterrent device (air cannon 187 or strobe light 188) is activated.

Deterrent processor 180 also formats target data for network interface card (NIC) 182 for transfer over network 183

(along with data 189 from other avian radars) to central processor 184. Central processor 184 implements a wide area avian radar to track and monitor birds throughout the entire wind farm on display 185.

By implementing a wide area avian radar, individual avian radars throughout the wind farm can receive handoff tracking information from central processor 184 to indicate which resolution volume cells 409 that should be monitored by local avian radars along a bird's path as it moves through the wind farm. Central processor 184 can also command wind turbines 20 along the predicted path of bird flocks to feather their blades in advance of the flock's arrival at each wind turbine.

Radar is a very mature field with many choices available for frequency, transmit power, and waveform design. Both pulsed and CW waveforms can be used as is well known by anyone skilled in the art. Radar detection is a function of transmit energy, irrespective of the transmit signal waveform design. However, range resolution and Doppler resolution are determined by the actual waveform design as illustrated in FIG. 6.

Figure 6:
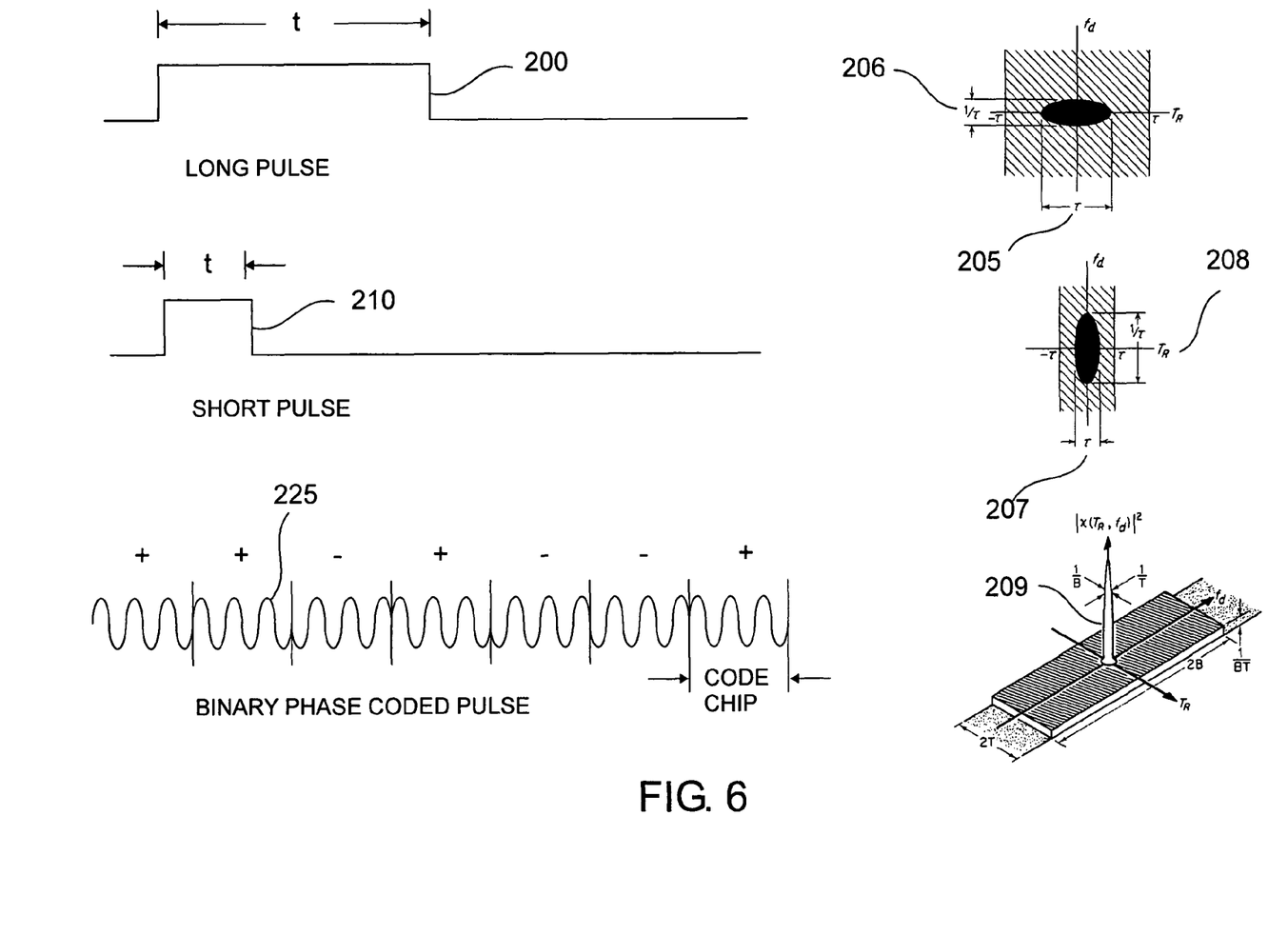
FIG. 6 illustrates the ambiguity diagram of various radar signal waveforms.

FIG. 6 illustrates the ambiguity function of common radar waveforms. Range and Doppler resolution are defined by the radar signal ambiguity function which is simply the cross correlation between the transmit pulse and its range and Doppler shifted versions as is well known by those skilled in the art.

Long pulse 200 is characterized by low range resolution 205 and high Doppler resolution 206. Short pulse 210 is characterized by high range resolution 207 and low Doppler resolution 208. PN coded pulse compression waveform 225 has both high range and Doppler resolution as illustrated by thumbtack response 209.

Although pulse type radar signals can be used, the most appropriate radar signal for the bistatic radar described in this invention is a CW radar signal using PN coded pulse compression waveform 225. A CW radar does not have the close range reception dead zone caused by transmit pulse blanking required in pulse type radars.

The selection of transmit power, waveform design, and all radar hardware implementation tradeoffs are well known by practicing radar engineers for bistatic radars. The radar cross section for a large variety of birds at different frequencies and aspect angles are available in the literature. The nominal radar cross section of a pigeon is 0.01 square meters.

Although many different transmit frequencies could be chosen for an avian radar, S-band is more appropriate than X-band because the radar cross section of birds is larger and rain penetration is better at S-band frequencies than at X-band frequencies.

Detecting pulse compression waveforms is very computationally intensive and processing every coverage volume 3D resolution volume cell 409 is difficult. To vastly reduce the processing requirements, only a thin outer surface of the coverage volume needs to be processed continually. A target can only enter the interior coverage volume by first passing through its outer surface. By continually processing a thin surface skin, all targets entering the coverage volume are detected. Once detected, they can be tracked as they move within the interior coverage volume. Targets in critical areas, for example close to wind turbines 20, can be tracked to within their 3D resolution volume 409.

This avian radar is very well suited for the use of parallel processing. Through the use of lookup tables that relate 3D resolution volume cells 409 with their corresponding bistatic transmitter signal ranges, multiple processors can be programmed to simultaneously examine different collections of radar bins or 3D resolution volume cells 409. Radar bins containing targets can be passed to other processors that locate all targets in that radar bin to their 3D resolution volume cell 409. Using multiple parallel processors, almost any desired radar resolution and update performance can be obtained simply by adding processing resources.

Although this radar has been described to protect wind turbines and wind farms, it can also be used to protect birds from other hazards such as oil sands tailing ponds, electrical substations, and power lines.

Figure 7:
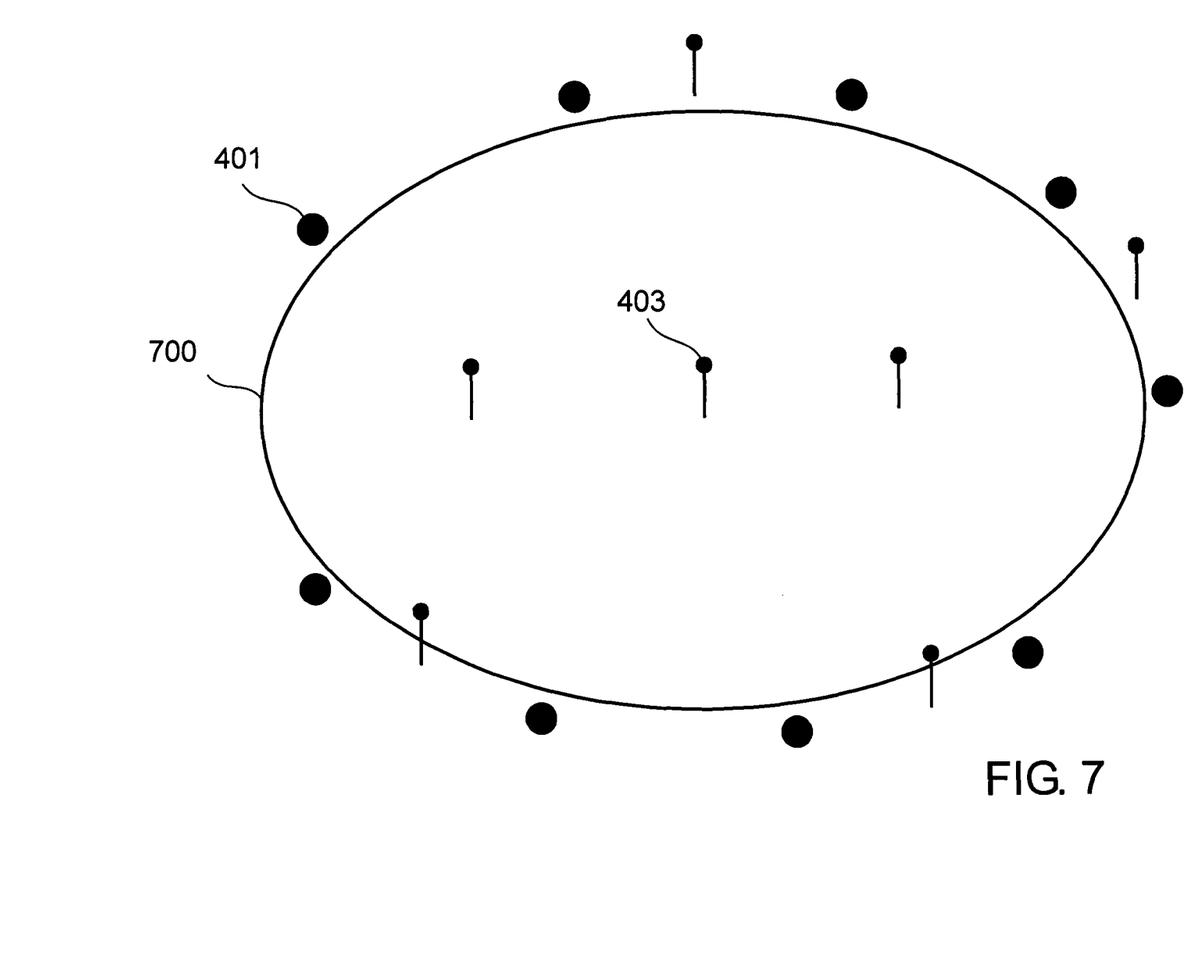
FIG. 7 illustrates the application of this avian radar system to oil sands tailing ponds.

FIG. 7 illustrates the application of this wide area avian radar to oil sands tailing ponds. These ponds are filled with residual oil and toxic waste from the oil sands extraction process. If ducks land on these ponds, they become covered with oil and die.

FIG. 7 illustrates large pond 700 around which a number of bistatic radar transmitters 401 are deployed. Bistatic radar receiver antennas 403 are deployed in and around pond 700. Air cannons (not shown) are also deployed near or at each receiver antenna 403 site. When ducks are detected, the air cannons fire as the ducks approach the water, thus deterring them.

The advantage of this type of installation is that the deterrents and radar detection can be spread out across a large pond. The high bird positional accuracy of this avian radar allows the air cannons to be mounted on rotating mounts and pointed towards the landing birds. Air cannons are most effective when fired only when birds are about to land. If air cannon blasts are frequent or continuous, the birds get used to the noise and simply ignore the blasts.

Other structures, such as electrical substations and power lines can easily be protected to prevent bird kills by distributing these avian radar units and deterrents around the substation or along power line paths. Airports could also be protected using a networked array of avian radars, as described in this invention, instead of using the single centralized receiver described in patent application Ser. No. 12/661,595.

Although the preferred embodiments of the invention have been illustrated and described in detail, it will be readily apparent to those skilled in the art that various modifications may be made therein without departing from the spirit of the invention. This invention can also be used for many applications other than avian radar. Potential applications include intrusion detection, border security, or various military uses.

What is claimed is:

1. A method for detecting, precisely determining location, and deterring birds in a surveillance volume around wind turbines or other avian hazards so as to prevent collisions of said birds with said hazards, said method comprising:

providing at least one bistatic radar receiver near said hazard;

illuminating said surveillance volume with radar signals from a plurality of bistatic transmitters;

locking timing, frequency, and said radar signals zero range time of said bistatic transmitters and said bistatic receiver to GPS time;

operating said bistatic transmitters autonomously with no communication between said bistatic receiver and said bistatic transmitters;

receiving reflections of said radar signals at said bistatic radar receiver from said birds in said surveillance volume;

determining said locations of birds from location of said bistatic radar receiver, locations of said bistatic transmitters, and said reflections; and activating a bird deterrent to deter away birds on a collision course with said avian hazard.

2. A method as claimed in claim 1 wherein said bistatic radar receiver receives said reflections using a vertical dipole antenna.

3. A method as claimed in claim 1 wherein said radar signals are continuous wave (CW) pseudo random noise (PN) coded pulse compression waveforms, and said radar signals from said bistatic transmitters all transmit on the same frequency but are modulated with different PN codes.

4. A method as claimed in claim 1 further comprising:
defining a resolution volume cell in said surveillance volume;
calculating a signal range value for a bistatic transmitter, said signal range value equal to the total path length from said bistatic transmitter to center of said resolution volume cell to said bistatic receiver;
calculating a said signal range value for the remaining said bistatic transmitters;
collecting said signal range value calculated for all said bistatic transmitters into a cell list for said resolution volume cell location;
dividing said surveillance volume into a plurality of resolution volume cells; and
forming a lookup table associating said cell list to said resolution volume cell location for said plurality of resolution volume cells.

5. A method as claimed in claim 4 further comprising:
selecting a said resolution volume cell location;
retrieving said cell list for selected said resolution volume cell location from said lookup table;
performing a cross correlation between said reflections and each bistatic transmitter radar signal using range delay information provided by said signal range value in said cell list; and
declaring bird location as said resolution volume cell location when said cross correlation from a sufficient number of said bistatic transmitters exceed a predetermined target detection level.

6. A method as claimed in claim 5 further comprising:
dividing said surveillance volume into one or more sub-volumes;
monitoring only resolution volume cell locations near the outer surfaces of said sub-volumes for radar targets; and
tracking detected said radar targets as said radar targets move through interiors of said sub-volumes.

7. A method as claimed in claim 6 further comprising:
implementing a plurality of digital parallel processors, said parallel processors configured to simultaneously monitor different said sub-volumes or different sets of said resolution volume cell locations.

8. A method as claimed in claim 1 wherein one or more of said bistatic transmitters incorporate antennas designed to attenuate their transmitted radar signal at low antenna elevation angles.

9. A method as claimed in claim 1 further implementing a wide area avian radar system to track and monitor birds throughout an entire wind farm, said method comprising:
providing a local area network throughout said wind farm;
providing a central processor at a convenient location in said wind farm;
sending data to said central processor over said local area network of said locations of birds from a plurality of said bistatic radar receivers implemented throughout said wind farm;
calculating the predicted path of a bird or bird flocks throughout said wind farm; and
commanding wind turbines along said predicted path to feather their blades in advance of said bird or bird flocks arrival at said wind turbines.

10. A high resolution bistatic radar for precisely determining avian target locations in a surveillance area around wind turbines or other avian hazards so as to prevent collisions of said birds with said hazards, said bistatic radar comprising:
a plurality of bistatic transmitters configured to illuminate said surveillance area with radar signals;
a GPS receiver configured to lock said bistatic transmitters transmit frequency and zero range time to GPS time;
an antenna coupled to a bistatic radar receiver configured to receive reflections of said radar signals from avian targets in said surveillance area;
a GPS receiver configured to lock said bistatic radar receiver timing to GPS time and to indicate zero range time of said bistatic transmitters radar signals;
a signal detection processor coupled to said radar receiver and configured to detect said reflections of said radar signals;
a target processor coupled to said signal detection processor and configured to determine said avian target locations in said surveillance area;
a deterrent processor coupled to said target processor and configured to activate a bird deterrent to deter away birds on a collision course with said avian hazard; and
one or more deterrent devices coupled to said deterrent processor.

11. A high resolution bistatic radar as in claim 10 wherein said bistatic radar receiver additionally comprises:
a low noise amplifier and band pass filter configured to amplify and filter said reflected radar signals;
a local oscillator, mixer, and intermediate frequency filter coupled to said band pass filter to downconvert and anti-alias filter said reflected radar signals; and
an analog to digital converter to digitize said reflected radar signals.

12. A high resolution bistatic radar as in claim 10 wherein said signal detection processor additionally comprises a plurality of matched filters, said filters matched to different Doppler offset frequencies of said reflected radar signals from said avian targets.

13. A high resolution bistatic radar as in claim 10 wherein said signal detection processor additionally comprises a signal detector configured to measure target parameters of said avian targets, said target parameters include azimuth, elevation, range, amplitude, velocity, and spectral width.

14. A high resolution bistatic radar as in claim 10 wherein said target processor is configured to apply tracking and spectral width algorithms to said target parameters to eliminate non-avian targets, identify probable bird type, and form target tracks for said deterrent processor.

15. A high resolution bistatic radar as in claim 10 wherein said one or more deterrent devices are either strobe lights, sound generators, air cannons, or some combination thereof.

\* \* \* \* \*